April 1, 1969 G. S. COLE ET AL 3,436,054

LINE VALVE OF THE COMPRESSIBLE-TUBE TYPE

Filed Aug. 15, 1966

INVENTORS
George S. Cole and
Richard L. Ritzenthaler
by Zabel, Baker, York,
Jones & Dithmar
Attys

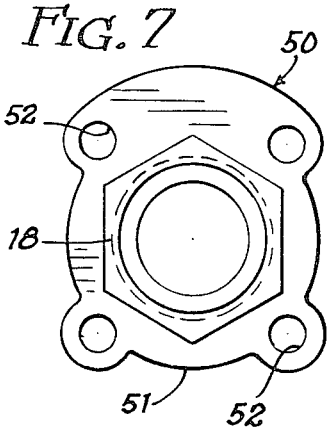
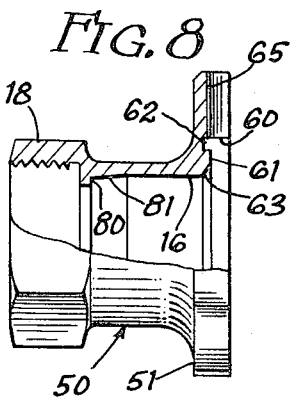
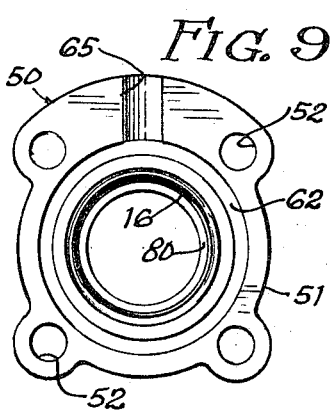
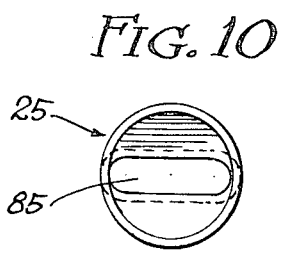
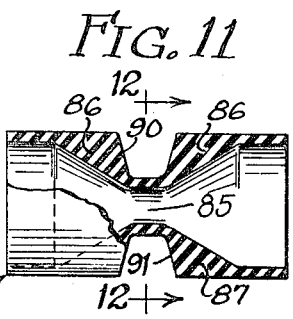
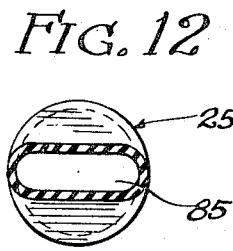
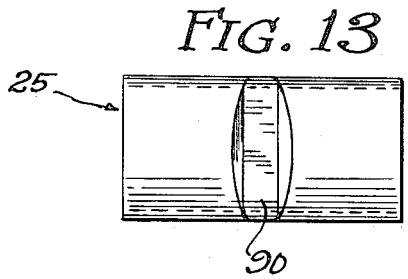

United States Patent Office 3,436,054
Patented Apr. 1, 1969

3,436,054
LINE VALVE OF THE COMPRESSIBLE-TUBE TYPE
George S. Cole, 400 N. Michigan Ave., Chicago, Ill. 60611, and Richard L. Ritzenthaler, Evanston, Ill. (400 N. Michigan Ave., Chicago, Ill. 60611)
Filed Aug. 15, 1966, Ser. No. 572,405
Int. Cl. F16k 7/06
U.S. Cl. 251—8      6 Claims

ABSTRACT OF THE DISCLOSURE

A line valve of the compressible-tube type wherein a resilient tube is compressed or pinched in its central region between a transverse abutment and a movable control element. The resilient tube has walls of increased thickness in regions adjacent the abutment and movable control element. The tube at its ends abuts annular shoulders in a valve housing, and the spacing between the shoulders is slightly less than the axial length of the tube when undistorted, whereby the tube is compressed axially in the housing, insuring desired sealed relationship between tube and housing. The interior housing walls inwardly of the annular shoulders taper to a reduced diameter adjacent the shoulders, further cooperating to establish a sealed relationship between tube and housing.

---

This invention relates to a line valve, and more particularly to a line valve of the compressible-tube type wherein a resilient tube is compressed or pinched in its central region between a transverse abutment and a movable control element.

An early valve of this general type is shown in the U.S. Patent No. 1,024,876, dated Apr. 30, 1912. The present valve provides many improvements over the valve of the aforesaid patent.

One object of the invention is to provide a line valve of the compressible-tube type wherein the walls of the tube have increased thickness in regions adjacent the abutment and movable control element where the tube tends to separate from the valve body during actuation of the valve. This feature cooperates to prevent objectionable distortion of the tube by fluid pressure during such times, thus permitting the valve to have small size, and, of great importance, to utilize hydrostatic pressure as a factor in establishing a seal when the valve is closed.

Another object of the invention is to provide a line valve of the character described wherein the closure elements move into engagement with, or bottom on, each other, thereby preventing damage to, or abuse of, the compressible resilient tube.

Still another object is to provide such a valve wherein the compressible resilient tube is mounted in the valve body such that the tube is prestressed in axial compression. This feature cooperates to maintain the desired seal between the tube and valve body when the tube is pinched in actuating the valve.

Another object is to provide a valve of this type wherein the valve body comprises a pair of like body members, each having a radially extending flange at one end. The two body members are detachably secured together with the flanges in abutting relation. The flanges have aligned counterbores which receive an abutment member and a movable control member which cooperate to open and close the valve.

Yet another object is to provide a valve of this character wherein the abutment member is self-aligning, thereby avoiding close tolerances otherwise required.

Another object is to provide an indicating means for a valve of this type which affords an index to valve setting.

Other objects, advantages and details of the invention will be apparent as the description proceeds, reference being had to the accompanying drawings wherein one embodiment of the invention is shown. It will be understood that the description and drawings are exemplary only, and that the scope of the invention is to be measured by the appended claims.

In the drawings:

FIG. 7 is an end view of one of the two like body members used in the illustrated embodiment of the invention.

FIG. 8 is an elevational view, partly in section, of the body member shown in FIG. 7.

FIG. 9 is an end elevational view of the body member, the end shown being opposite to that of FIG. 7.

FIG. 10 is an end elevational view of the compressible resilient tube used in the illustrated embodiment of the invention.

FIG. 11 is a side elevational view, partly in section, of the tube shown in FIG. 10.

FIG. 12 is a sectional view on line 12—12 of FIG. 11.

FIG. 13 is a top plan view of the tube shown in FIGS. 10–12.

Figure 1:
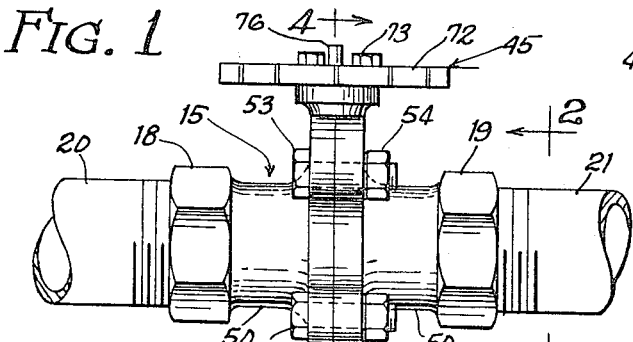
FIG. 1 is a side elevational view of a line valve embodying the invention.
Figure 2:
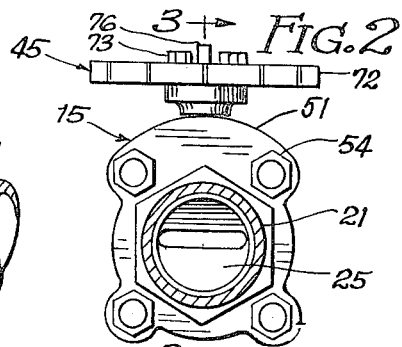
FIG. 2 is a sectional view on line 2—2 of FIG. 1, essentially an end elevational view of the valve.

Referring to the drawings, the illustrated valve embodying the invention comprises a valve body generally designated 15 having a generally cylindrical passageway 16 extending from end to end. Means 18 and 19 are provided at the ends of valve body 15 for coupling inlet and outlet pipes 20 and 21.

Figure 3:
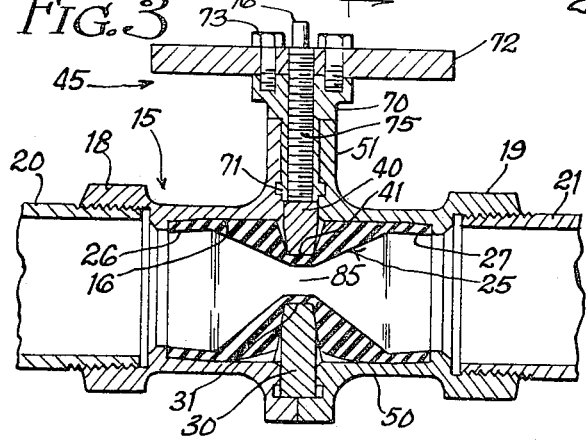
FIG. 3 is an enlarged sectional view on line 3—3 of FIG. 2, the valve shown at fully opened setting.

A tube 25 of resilient material such as rubber or the like for example a synthetic rubber sold by DuPont under the trademark "Nordel," is disposed within passageway 16, as best shown in FIG. 3. Ends 26 and 27 of tubes 25 are sealed to valve body 15 at the ends of passageway 16.

An abutment member 30 is carried by valve body 15 and disposed transversely within passageway 16 centrally of valve body 15 and tube 25. Abutment member 30 has a generally straight edge 31 (FIG. 4) engaging one side of tube 25, namely, the lower side of the tube as shown in the drawings. The ends of abutment member 30 are recessed as indicated at 32 and 33, providing stops 34 and 35.

A movable control member 40 has a generally straight edge 41 (FIG. 4) which engages the side of tube 25 opposite to the side engaged by abutment member 30. As shown, straight edge 41 of movable control member 40 engages the upper side of tube 25. Movable control member 40 is in alignment with abutment member 30, as best shown in FIG. 3.

Figure 6:
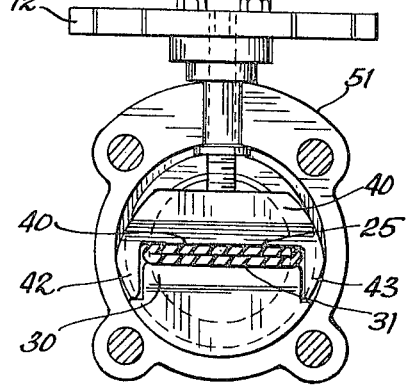
FIG. 6 is a view similar to FIG. 4 except that the valve is shown in fully closed position.

Control member 40 has projections 42 and 43 (FIG. 4) at the ends of straight edge 41, which projections are adapted to bottom on stops 34 and 35 of abutment member 30 when control member 40 is in valve-closed position, as shown in FIG. 6. This arrangement prevents damage to, and abuse of, the central portion of resilient tube 25.

Means generally designated 45 function to move control member 40 toward and away from abutment member 30 to close and open the valve, as will be seen later in the description of more detailed aspects of the invention.

Valve body 15 in the illustrated embodiment of the invention comprises a pair of like body members 50, 50. A body member 50 is shown in detail in FIGS. 7-9. Body member 50 is generally tubular in shape, and is provided at one end with a flange 51 extending radially outwardly. Suitable means are provided to secure the two body members together detachably with flanges 51 in abutting relation, and in the embodiment shown flanges 51 are provided with circumferentially spaced openings 52 to receive bolts 53 (FIG. 1) having nuts 54.

As best shown in FIG. 8, flange 51 has a counterbore designated 60 providing an annular wall 61 at the bottom of the counterbore. An annular recess 62 is provided in the radially outward portion of annular wall 61. The purpose of recess 62 will be mentioned later. The radially inward edge of annular wall 61 is chamfered as shown at 63 to facilitate the insertion of tube 25 in body member 50 and to eliminate a sharp corner against which the tube could expand under pressure.

As best shown in FIG. 3, abutment member 30 and movable control member 40 are recived within the space provided by aligned counterbores 60 when a pair of body members are secured together. With this arrangement, abutment member 30 is self-aligning within the counterbore space, thereby avoiding the need for close tolerances in establishing parallelism between abutment member 30 and control member 40.

Still referring to FIG. 8 and additionally to FIG. 9, flange 51 of each body member 50 has a semicylindrical radial recess 65. When a pair of body members 50 are secured together, the recesses 65 are aligned in registering relation to provide communication between the valve exterior and movable control member 40 within the valve body.

Means 45 for moving control member 40 toward and away from abutment member 30 comprises, in the illustrated embodiment, an interiorly threaded sleeve member 70 (FIG. 3) mounted for rotation in radially fixed position in part within the registering recesses 65 of flanges 51 of a pair of assembled body members 50. Sleeve member 70 is secured in radially fixed position by means of a collar 71 integral with the sleeve member which is adapted to be received within recess 62 (FIGS. 8 and 9). Recesses 62 are effective only in the vicinity of radial recesses 65, but recess 62 is formed as an annulus for convenience of manufacture.

Suitable means for rotating sleeve member 70, such as the illustrated handwheel 72, or any other manual or automatic mechanism, is associated with sleeve member 70. As shown, handwheel 72 is secured to sleeve member 70 by means of bolts 73.

A threaded shaft 75 (FIG. 3) has threaded relation with sleeve member 70. Shaft 75 at its radially inner end is secured in nonrotatable manner to movable control member 40. Thus, as threaded sleeve member 70 is rotated in one direction or the other by means of handwheel 72 or other mechanism, threaded shaft 75 moves radially inwardly or outwardly, changing the position of control member 40 with respect to abutment member 30 and opening or closing the valve.

Figure 4:
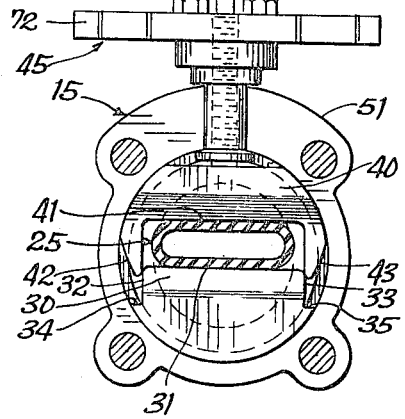
FIG. 4 is an enlarged view, partly in section, on line 4—4 of FIG. 1, the valve also shown in fully opened setting.
Figure 5:
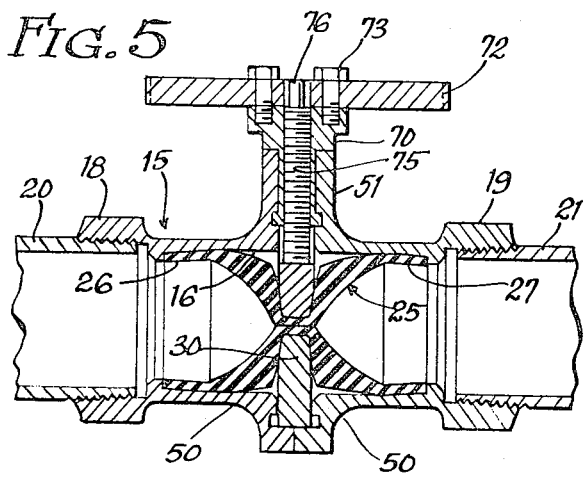
FIG. 5 is a sectional view similar to FIG. 3 except that the valve is shown in fully closed position.

As mentioned, FIGS. 3 and 4 show the valve in fully opened setting, while FIGS. 5 and 6 show the valve in fully closed setting. Intermediate settings, of course, are possible, thereby permitting streamlined fluid flow at intermediate rates.

It often is desirable to have visual indication of valve setting, and in many instances such indication may be provided by means of a pointer in association with a dial. However, valves of the present type occasionally are located in relatively inaccessible positions which render a dial unreadable. The valve of the invention is provided with an indicator which is readable in comparatively inaccessible locations.

The present indicator comprises the outer end portion 76 of threaded shaft 75. This outer end portion 76 gives shaft 75 an over-all length such that end portion 76 is concealed within sleeve member 70 or handwheel 72 when the valve is fully closed, and is visible above sleeve member 70 or handwheel 72 when the valve is opened in whole or in part. The part of end portion 76 visible constitutes a index to valve setting, as will be readily understood.

Referring again to resilient sleeve 25 and the portions of body members 50 receiving same, it will be remembered that the tube ends have sealed relation with the body members. As shown in FIG. 8, a body member 50 is provided with an inwardly facing annular shoulder 80 near the outer end of passageway 16. The ends of tube 25 engage the shoulders 80 of a pair of assembled body members 50. The shoulders 80 of such an assembled pair of body members are spaced axially from each other a distance less than the length of tube 25 when the tube is undistorted. Thus, tube 25 is compressed axially when positioned within a pair of assembled body members 50.

The interior wall of each body member inwardly of shoulder 80 tapers as shown at 81 to a reduced diameter adjacent the shoulder, thereby establishing the seal between tube 25 and the body members.

Referring to FIGS. 10-13, resilient tube 25 has a reduced throat 85 in the central region of the tube. The walls on the upper and lower sides of the tube 25 adjacent the ends of throat 85 are of increased thickness, as shown at 86 and 87, respectively, to prevent distortion of the tube by fluid pressure when the tube walls are spaced from the interior wall of valve body 15 and from the abutment and control members 30 and 40 during movement of control member 40.

It will be noted, for example in FIG. 5, that when the valve is closed, portions of tube 25 are forced away from engagement with the valve body. These portions are given increased thickness and thus requisite rigidity to prevent ballooning by the pressure of the fluid in the valve, thereby permitting the valve to have shorter length than otherwise would be required to maintain proper relation between length of tube and length of travel for control member 40.

The increased thickness walls 86 and 87 on the upstream side of throat 85 of tube 25 cooperate, as will be evident from FIG. 5, to utilize hydrostatic pressure as a factor in establishing a seal when the valve is closed.

Recesses 90 and 91 in upper and lower sides of tube 25 are complementary to the reduced elongated throat in the central tube region, and these recesses, as shown in FIGS. 3 and 4, receive movable control member 40 and fixed abutment member 30, respectively.

Throat 85 (FIGS. 3 and 10-12) of tube 25 acts as a partial venturi, thereby minimizing pressure drop and permitting the valve to be made smaller in size than otherwise.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A line valve comprising:
   a valve body having a generally cylindrical passageway from end to end;
   means at the ends of said valve body for coupilng inlet and outlet pipes;
   a resilient tube within said passageway, the ends of said tube sealed to said valve body at the ends of said passageway, said tube having a throat in the central region with the tube walls adjacent the ends of the throat of increased thickness on opposing sides of the tube;

an inwardly facing annular shoulder on said valve body at each end of said passageway, the ends of said resilient tube engaging said shoulders, said shoulders spaced a distance less than the length of said tube when undistorted, whereby said tube is compressed axially in said passageway;

an abutment member carried by said valve body and disposed transversely within said passageway centrally of said tube, said abutment member having a generally straight edge engaging one opposing side of said tube;

a movable control member having a generally straight edge engaging the other opposing side of said tube in alignment with said abutment member; and means moving said control member toward and away from said abutment member to close and open said valve, whereby said tube walls of increased thickness prevent distortion of the tube when portions of the tube are separated from said valve body during movement of said movable control member and on the upstream end of the throat respond to hydrostatic pressure to establish a seal when the valve is closed.

2. The combination of claim 1 wherein the interior wall of said valve body tapers in the end regions of said passageway to a reduced diameter adjacent said shoulders, thereby establishing the seals between said tube and said valve body.

3. The combination of claim 1 wherein said valve body comprises a pair of like body members generally tubular in shape each having a radially outwardly extending flange at one end, and with the addition of means detachably securing said flanges together in abutting relation, said flanges having aligned counterbores receiving said abutment member and said movable control member.

4. The combination of claim 3 wherein said abutment member is self-aligning within said aligned counterbores and one of said control member and said abutment member has projections at the ends of its straight edge adapted in closed position to engage the other of said members whereby mechanical abuse of said tube is avoided and said abutment member becomes aligned with said control member.

5. The combination of claim 3 wherein each flange has a radial recess, the recesses in registering relation providing communication between the valve exterior and said movable control member.

6. The combination of claim 5 wherein said means moving said control member toward and away from said abutment member comprises an interiorly threaded sleeve member mounted for rotation in radially fixed position within said registering flange recesses, means for rotating said sleeve member, and a threaded shaft in threaded relation with said sleeve member and non-rotatably secured to said control member.

References Cited

UNITED STATES PATENTS

| | | | |
|---|---|---|---|
| 1,024,876 | 4/1912 | Barbour | 251—8 |
| 3,117,904 | 1/1964 | Black | 251—7 XR |
| 3,134,570 | 5/1964 | Jarrett | 137—556 XR |

FOREIGN PATENTS

| | | |
|---|---|---|
| 698,188 | 10/1953 | Great Britain. |
| 325,162 | 3/1935 | Italy. |

ALAN COHAN, *Primary Examiner.*

RICHARD GERARD, *Assistant Examiner.*